US011223386B2

(12) United States Patent
Tmimi et al.

(10) Patent No.: US 11,223,386 B2
(45) Date of Patent: Jan. 11, 2022

(54) DATA TRANSMISSION, IN PARTICULAR ON A SERIAL LINK HAVING A GREAT LENGTH

(71) Applicant: STMicroelectronics SA, Montrouge (FR)

(72) Inventors: Mohammed Tmimi, Grenoble (FR); Philippe Galy, Le Touvet (FR)

(73) Assignee: STMicroelectronics SA, Montrouge (FR)

( * ) Notice: Subject to any disclaimer, the term of this patent is extended or adjusted under 35 U.S.C. 154(b) by 0 days.

(21) Appl. No.: 16/878,084

(22) Filed: May 19, 2020

(65) Prior Publication Data

US 2020/0373965 A1     Nov. 26, 2020

(30) Foreign Application Priority Data

May 22, 2019   (FR) ...................................... 1905369

(51) Int. Cl.
*H04B 3/02*   (2006.01)
*H04L 27/20*   (2006.01)

(52) U.S. Cl.
CPC ........... *H04B 3/02* (2013.01); *H04L 27/2071* (2013.01)

(58) Field of Classification Search
CPC ...................................................... H04B 3/02
USPC ........................................................ 375/257
See application file for complete search history.

(56) References Cited

U.S. PATENT DOCUMENTS

| | | | | |
|---|---|---|---|---|
| 3,392,238 A * | 7/1968 | Lender | .................. | H04L 25/497 375/284 |
| 5,029,003 A * | 7/1991 | Jonnalagadda | .......... | H04N 7/06 348/493 |
| 5,933,455 A * | 8/1999 | Hendrickson | ......... | H04L 25/062 375/261 |
| 6,115,593 A * | 9/2000 | Alinikula | ............... | H03D 3/008 375/316 |
| 2005/0275425 A1* | 12/2005 | Lee | ...................... | H04L 25/0272 326/30 |
| 2008/0089443 A1* | 4/2008 | Sanada | ............... | H04L 27/2657 375/319 |
| 2010/0240331 A1* | 9/2010 | Nagayama | ............... | H03F 3/245 455/127.1 |
| 2013/0266048 A1* | 10/2013 | Chang | ...................... | H04B 5/02 375/219 |
| 2016/0277212 A1* | 9/2016 | Forbes | ...................... | H04L 5/14 |
| 2020/0065270 A1* | 2/2020 | Mobin | .................. | H01L 23/645 |

* cited by examiner

*Primary Examiner* — Lihong Yu
(74) *Attorney, Agent, or Firm* — Crowe & Dunlevy (57) ABSTRACT

Binary data is processed through a differential pre-encoder, which includes a simple modulo-2 addition. This step is used to cancel the propagation error that can be introduced by duo-binary modulation and to simplify demodulation. Next the duo-binary encoder introduces controlled Inter Symbol Interference between a previously sent bit and a present bit to compress the spectral density closer to the DC. Next a 60-GHz carrier is modulated and transmitted over differential transmission lines.

36 Claims, 5 Drawing Sheets

DATA TRANSMISSION, IN PARTICULAR ON A SERIAL LINK HAVING A GREAT LENGTH

PRIORITY CLAIM

This application claims the priority benefit of French Application for Patent No. 1905369, filed on May 22, 2019, the content of which is hereby incorporated by reference in its entirety to the maximum extent allowable by law.

TECHNICAL FIELD

Embodiments relate to signal transmission over a communication medium, and in particular, to a self-adaptive high speed serial link.

BACKGROUND

Transistor scaling allows achieving higher density packing of devices along with faster transistors. However, the performance of the interconnections within such high density devices has not kept pace with transistor miniaturizing, and today is therefore the main bottleneck for high-speed transceivers developments. Higher transistor density in a device also implies higher wire density.

In that context, a RF link may still lead to an effective solution for "on chip" long range connections.

However, wires are more sensible to their environment as compared to active devices, i.e., closer wires are more sensible to crosstalk and RC delay.

One other main issue in communication systems is distortion due to the channel physical properties. This might be due either to the dispersive nature of the channel where the frequency components propagate at different velocities, or due to an increase in the attenuation coefficient of the channel due to the skin effect, for example. The attenuation is much higher for high frequencies components and causes the pulse traveling through the channel to both decrease in amplitude and spread in time domain.

Several methods have been carried out in order to address these issues.

Equalization was used to reduce the frequency selectivity of the channel by reversing the distortion. Then, reconstructing the original transmitted signal, the coefficients for the equalizers can be either fixed for a time-invariant channel using training sequences or after an estimation of the channel.

Otherwise, to reverse the effect of the time-varying channel, an adaptive equalization is utilized where a known training sequence is inserted periodically, then algorithms such as least mean square are used to update the coefficients of the equalizer.

For a fixed channel, to reach higher data rates, larger bandwidths in the base band are to be equalized, or more complex modulations such as PAM-4 can be used.

However, several comparators are used for PAM modulation and more complex filters and algorithms are required for equalization.

Moreover, the complexity and power consumption of the equalizers has dramatically increased in the last years. The equalization approach was attractive with the transistor and voltage scaling, which is not optimal anymore since voltage scaling is slowing down. Thus the complexity of the system limits the reachable data rates.

Further, high speed serial links for large integrated circuits (ICs) are mostly based on digital architectures. Because of signal energy loss, digital repeaters are added to maintain signal integrity for long distance link (several mm). These repeaters disrupt the floor plan and increase power consumption. A dedicated floorplan has to be designed for different distances. Prior art high speed serial links radio frequency (RF) architecture disclose ASK modulation with a max data rate of 5 Gbps, and are not portable from one technology node to another.

There is thus a need for further developments to address these issues.

SUMMARY

It is proposed in particular, as far as possible, to: achieve efficient long distance (several mm) high speed serial links for large integrated circuits (ICs); obtain minimal or nearly minimal on-chip serial link propagation delay; avoid redesign for different serial link lengths i.e., one design covers several serial link lengths; avoid disrupting the floorplan with repeaters for long distance links; provide robust long distance serial link design (no error code correction or equalization are used); and have portability of the system independent of the technology node.

According to embodiments, for large ICs, where long distance links over 1 mm are used, a practical alternative is proposed, where instead of transmitting in baseband as used in wireline communications, a high frequency, for example a radio frequency (RF) carrier is used to surpass the distortion caused by the channel. Furthermore this allows for smaller transmission delays (9 ps/mm instead of around 40 ps/mm in the baseband).

The RF propagation is advantageously combined with two coding techniques.

Firstly, duo-binary coding or modulation may be used to reach higher spectral efficiency (transmit R bits/sec in less than R/2 Hz of bandwidth), and differential pre-coding may be used to avoid error propagation (a disadvantage of the duo-binary coding) and also to simplify the decoding process.

A "self-mixing" technique may be used at the receiver stage, to simplify the decoding where an inverter may be used to recover the sent data.

Those techniques allow in particular to double the data rate in a limited bandwidth while simplifying the decoding process and reaching higher signal to noise ratio (SNR).

Such a new approach might also be used for wireless communications.

In other words, according to an embodiment, a mixed digital-RF high speed link is proposed. A digital signal is transformed into a duo-binary signal (3 levels) and modulated into a RF signal. Thanks to the duo-binary signal, 90% of the relevant signal is more compressed than regular modulation. This chain allows to achieve data rates higher than 10 Gbps for example in the frequency range 10-50 GHz (although it can work for much higher frequencies, for example hundreds of GHz), with a good balance between design complexity, transmission time and power consumption. A positive side-effect of the duo-binary coding combined with the self-mixing is the reduction of the number of amplitude states and thus the noise reduction improving the SNR compared to similar PAM-4. In addition, another embodiment discloses addition of a VGA or a custom design self-mixer to be distance independent up to 8 mm.

BRIEF DESCRIPTION OF THE DRAWINGS

Other advantages and features will appear in the detailed description below and in the appended drawings which are not limitative, in which.

DETAILED DESCRIPTION

An approach using a modulated radio frequency (RF) carrier suitable for long-range links up to several mm length is proposed. For example, a 10 Gbps length adaptive serial link for large digital integrated circuits (ICs) is described.

By using both RF and base band signaling on the same transmission line, it is possible to achieve higher data rate than only base band signaling.

RF-band signaling offers much higher available bandwidth with low latency.

Hence, it can be implemented as an approach for traffic bottlenecks in a Network on Chip (NoC) for example.

Here, as a non-limiting example, a 60-GHz carrier is proposed to transmit the data.

An RF transmission line is chosen because the group delay of the channel is almost constant over a wide bandwidth. Thus, the signal travels at the same speed that is equal to half the speed of light when considering standard back-end-of-lines, leading to low propagation delay as compared to the RC delay encountered at lower frequencies.

Next, to make use of the bandwidth efficiently, a pre-encoded duo-binary modulation is proposed to compress the spectrum of the signal and thus use a bandwidth smaller by a factor of two.

The pre-encoded duo-binary modulation leads to relaxed design constraints on the RF components compared to a non-return to zero (NRZ) modulation. Only half of the NRZ bandwidth is used. In addition, this duo-binary modulation can be used with a simple power detector without any local oscillator in the receiver.

Figure 1:
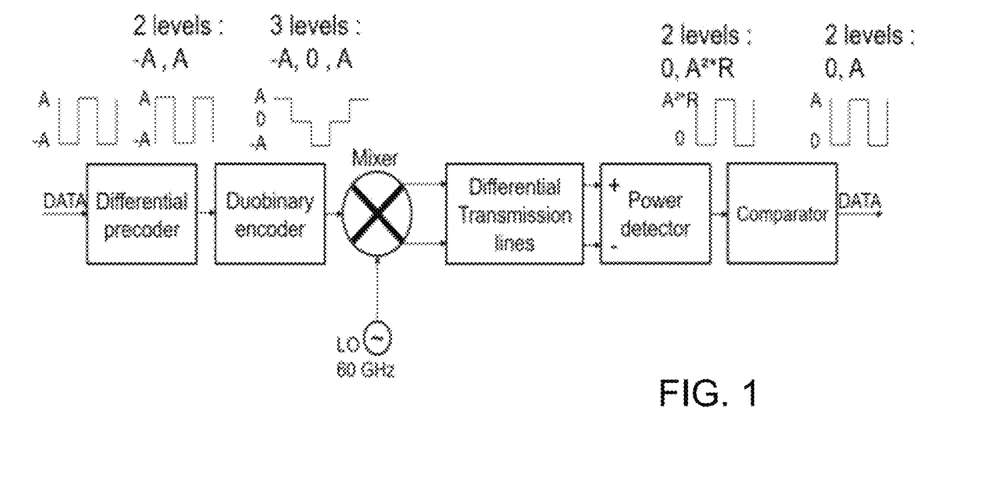
FIG. 1 is a block diagram of a communications system disclosed herein.

The proposed device or system is described in FIG. 1.

The binary data goes through the differential pre-encoder, which comprises a simple modulo-2 addition. This step is used to cancel the propagation error that can be introduced by the duo-binary modulation and to simplify the demodulation. Next, the duo-binary encoder introduces controlled Inter Symbol Interference (ISI) between the previously sent bit and the present bit to compress the spectral density closer to the DC. Next, the 60-GHz carrier is modulated and transmitted over differential transmission lines.

The proposed approach can be used for both single ended and differential lines. A differential transmission line was used herein because it is less sensitive to crosstalk and electromagnetic interference generated by nearby signal.

The amplitude of the received signal depends on both the transmitted power, which is considered as constant, and the attenuation of the transmission line, which is proportional to its length. An RMS power detector is used to demodulate the received signal and thus generate a 10 Gbps baseband signal from the received signal. Hence, the generated signal is a square function of the received signal amplitude. This operation also allows reducing the number of possible states from three to two as explained in the following sections.

Finally, the power detector output is compared to a threshold to generate the data for the following stage.

Figure 2:
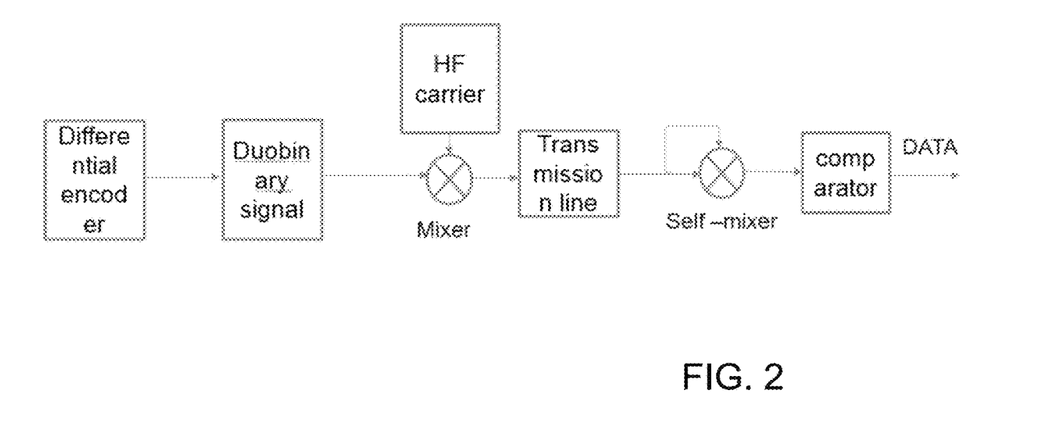
FIG. 2 is a block diagram of another embodiment of a communications system disclosed herein.

Another embodiment of the device is diagrammatically illustrated in FIG. 2.

This embodiment uses a self-mixer stage instead of a power detector.

When a power detector is used, a low pass filter may be provided after the power detector.

As it will be explained more in details thereafter, with a particular architecture of the self-mixer, the low pass filter can be avoided.

Figure 3:
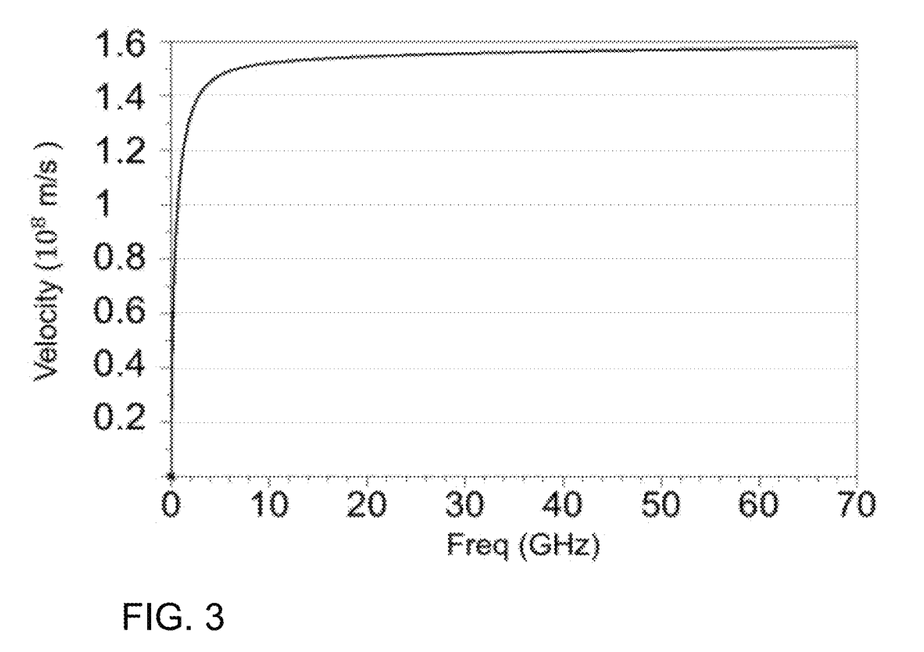
FIG. 3 is a graph of propagation speed vs frequency of on-chip interconnections.

On-chip interconnects offer a rather constant propagation speed at mm-waves, as shown in FIG. 3, where a 50-Ω microstrip line was simulated using the highest metal layer with the ground in M9 using the 10 Metal layers stack from STMicroelectronics 28-nm FD-SOI technology. The phase velocity increases rapidly from few MHz up to about 10 GHz. Then, from 10 GHz up to 60 GHz, the phase velocity increases only by 7%, meaning low dispersion.

Hence, for large bandwidth transmissions, a flat group delay is obtained, leading to reduced distortion and ISI as compared to a base-band transmission. The transmission line is designed in the back end of line (BEOL) with $SiO_2$ substrate with a relative dielectric constant equal to 4, leading to a signal that propagates with half the speed of light ($1.5 \times 10^8$ m/s). Thus, 5-mm on-chip length can be traveled in less than 50 ps.

Furthermore, for an appropriately matched transmission line, its delay can be linearly related to its length. Hence, the main characteristics of the propagation channel (attenuation and delay) are easily predictable and can be anticipated in the floorplan and design steps of the ICs. For the present case, the differential microstrip line uses 4.2-um wide strips with a 10-um spacing, leading to a 1.1-dB/mm attenuation at 60-GHz. Higher performance could be reached, but at the expense of larger footprint.

To simplify the use of serial links in large digital ICs, an adaptive length link is proposed to cover a large range of distances with the same transceiver without the requirement of repeater, thus limiting both power consumption and system complexity. For different link lengths, several parameters vary. Some of these parameters include the propagation delay, the receiver gain, and the noise figure of the transmission line, i.e., its insertion loss, which directly impact the Signal to Noise Ratio (SNR) and Bit Error Rate (BER) of the system.

For simplification reasons, consider a simple cascaded system of a transmitter (Gain $G_1$, and noise figure $F_1$) and the transmission line (attenuation $A_2$). The noise figure of the cascaded system $F_{casc}$ can be written as:

$$F_{casc} = F_1 + (A_2 - 1)/G_1 \qquad (1)$$

where $F_1$ is the noise figure and $G_1$ is the gain of the transmitter, respectively, which are considered as constant.

NRZ modulation is a low-complexity modulation, since the data is coded into two states; the main disadvantage of this modulation is its spectral efficiency, as it is not as efficient as more advanced modulations such as PAM-4 or duo-binary modulations. Duo-binary modulation is considered because it has the same spectral efficiency as PAM-4 but with lower complexity, fewer comparators, and fewer constraints on the linearity of the transmitter for example.

Figure 4:
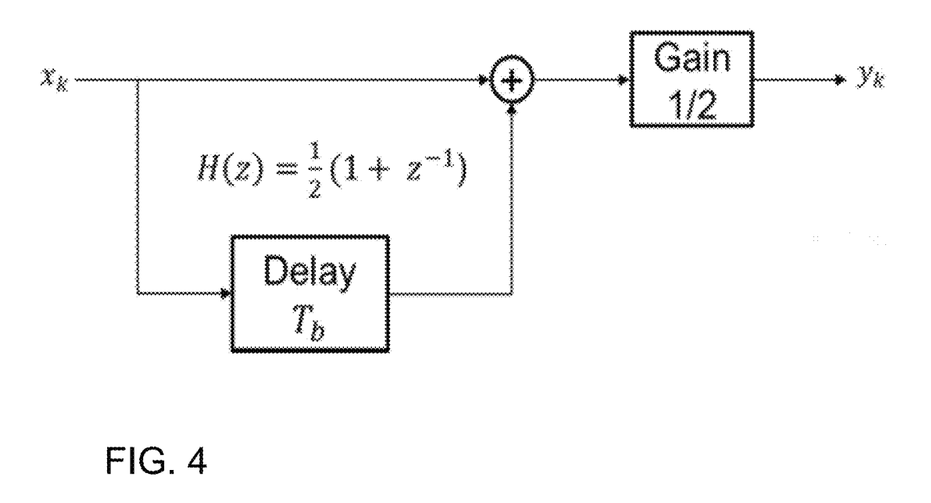
FIG. 4 is a diagrammatical representation of duo-binary modulation used by the communications systems described herein.

Duo-binary modulation is part of the poly-binary modulations. It can theoretically double the data rate transmitted through a channel bandwidth BW, where ISI is introduced in a controlled matter to be removed at the reception. In its general form, the duo-binary modulation output bit $y_k[n]$ as defined in the following equation $$y_k[n]=x_k[n-1]$$

as the sum of the previous bit $x_k[n-1]$ and the present bit $x_k[n]$ to be sent. It is described in FIG. 4.

Figure 5:
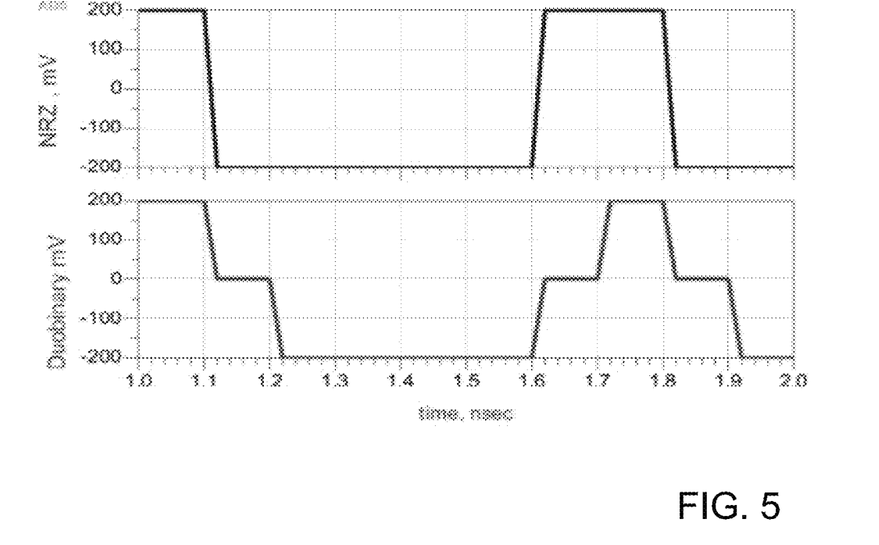
FIG. 5 is a graph of a pseudo-random binary sequence encoded by the communications systems described herein.

A 10 Gbps pseudo-random binary sequence coded in NRZ where $x_k=\pm 200$ mV was used, as shown in FIG. 5. In time domain, the duo-binary modulation results in an output signal with three levels, instead of the two levels of NRZ modulation.

Figure 6:
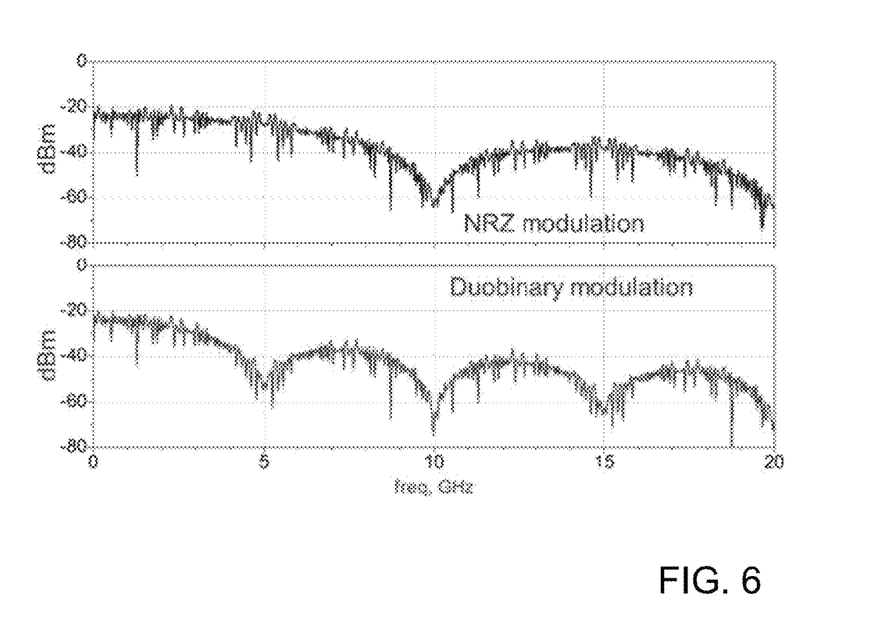
FIG. 6 spectral power density of a duo-binary modulation used by the communications systems described herein.

Considering simple duo-binary demodulation, for $r_k=\pm 200$ mV where $r_k$ is the received signal, the received bit is easily distinguishable since it can either take the value $r_k=200$ mV for a binary "1", $r_k=-200$ mV for a binary "0", for $r_k=0$V the received bit is decided by inverting the previously received bit. The spectral power density is shown in FIG. 6. Note that the duo-binary modulation compresses the main lobe of the spectrum to half the bandwidth used by NRZ modulation.

Figure 7:
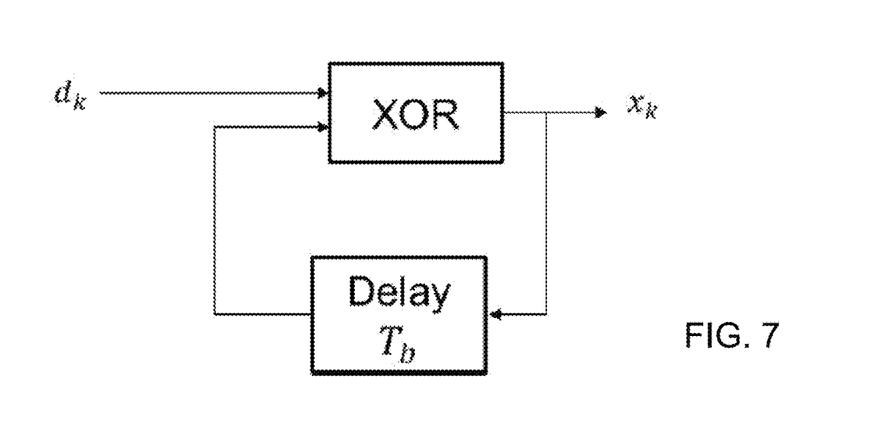
FIG. 7 is a block diagram of a pre-encoder for performing duo-binary modulation described herein.

The main drawback of duo-binary modulation is the propagation of an error to the next bits. To avoid this propagation error, a pre-encoder is preferably utilized, and this precoding is a modulo-2 addition operation. It can be realized using a XOR logic gate as follows: $x_k=x_{k-1}$ XOR $d_k$ with XOR being the modulo-2 addition.

Using this precoding, as shown in the simple scheme in FIG. 7, the duo-binary output states becomes binary "0" for $y_k=\pm 200$ mV and binary "1" for $y_k=0$V.

As mentioned before, a self-mixing operation at the receiver can be used to relax the carrier synchronization where no PLL or VCO are used at the receiver.

Furthermore, the self-mixing combined with the previously explained precoding and duo-binary modulations leads to a simpler demodulation process.

Before demodulation a three states signal is received:

$$y_k=\{-A^*\sin(2\pi ft),0,A^*\sin(2\pi ft)\},$$

where $y_k=0$V refers to a binary "1", while the two remaining states refer to binary "0".

With a self-mixing operation, the number of states after demodulation can be reduced to two states $y_k=\{0, kA^2\}$.

Hence, the recovered signal can be treated as a binary signal that can be compared to a threshold to generate the required amplitude for the following stage. The following stage may for example comprise an inverter.

Figure 8:
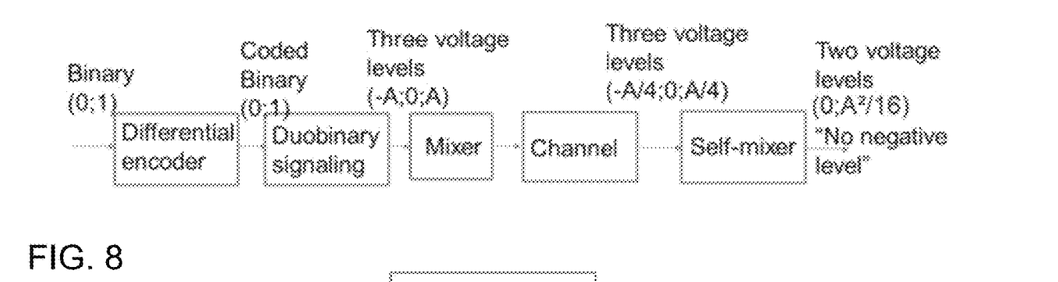
FIG. 8 is a diagrammatical representation of a self-mixing operation performed by the communications systems described herein.

FIG. 8 illustrates another example of the self-mixing operation.

In this example, A is the amplitude at the output and A/4 is the signal amplitude after the attenuation.

The binary zero is represented by $\pm A$ V.

Thus if we multiply the signal by itself, we obtain $(-A/4*-A/4=A^2/16)$ or $(A/4*A/4=A^2/16)$ The signal can thus be represented by two states at the receiver (0 and $A^2/16$).

Accordingly, one comparator is used instead of two.

No carrier synchronization at the receiver is used.

Figure 9:
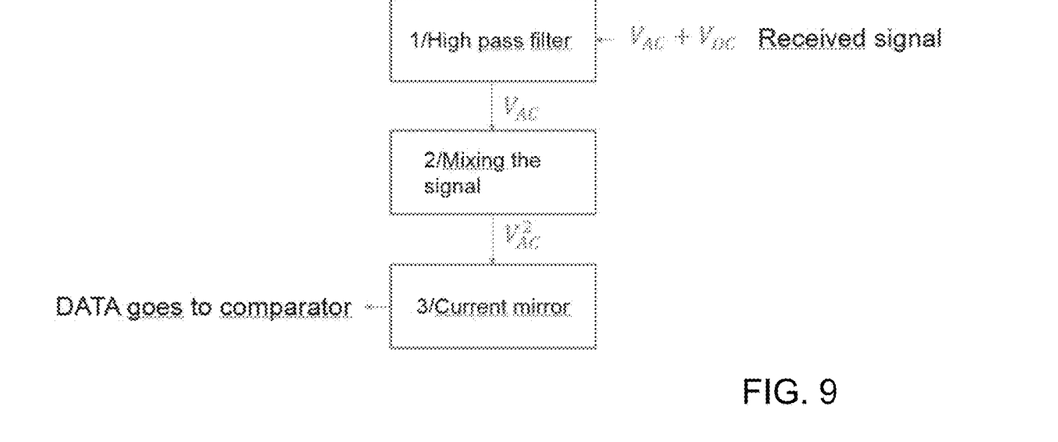
FIG. 9 is a diagrammatical representation of an example of a self-mixing stage for the communications systems described herein.

FIG. 9 illustrate an example of a self-mixing stage, which comprises a high pass filter, a multiplication stage or self-mixer and a current mirror.

The high pass filter filters out the low frequencies (DC offset).

Thus the remaining signal is the modulated carrier ($V_{AC}$), so that the signal amplitude depends on the carrier amplitude only, instead of carrier amplitude+DC offset.

The self-mixer multiplies the signal by itself, which generates a squared signal $V^2_{AC}$.

No external clock is used for synchronization.

A current mirror is used to amplify the signal.

A current mirror also acts as a low pass filter.

Figure 10:
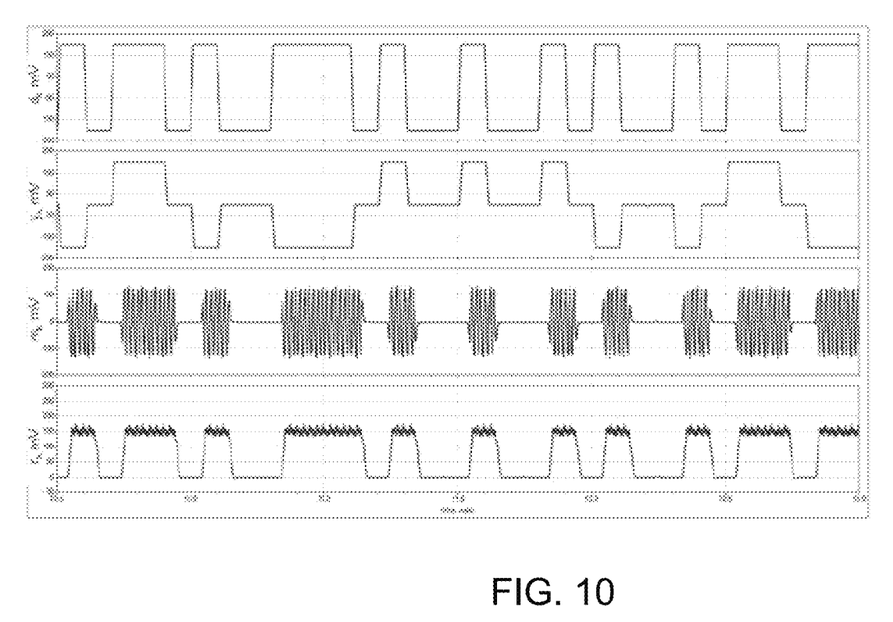
FIG. 10 is a graph showing time domain system level simulation results.

In FIG. 10, time domain system level simulation results are shown. The signal states through the device or system can be seen.

First line, $d_k$ is the binary data to be sent.

Next, $y_k$ is the duo-binary pre-encoded data used to modulate the 60 GHz carrier.

$m_k$ is the modulated signal before self-mixing, and $r_k$ is the received self-mixed signal.

The retrieved data after demodulation is the same as the sent data.

Figure 11:
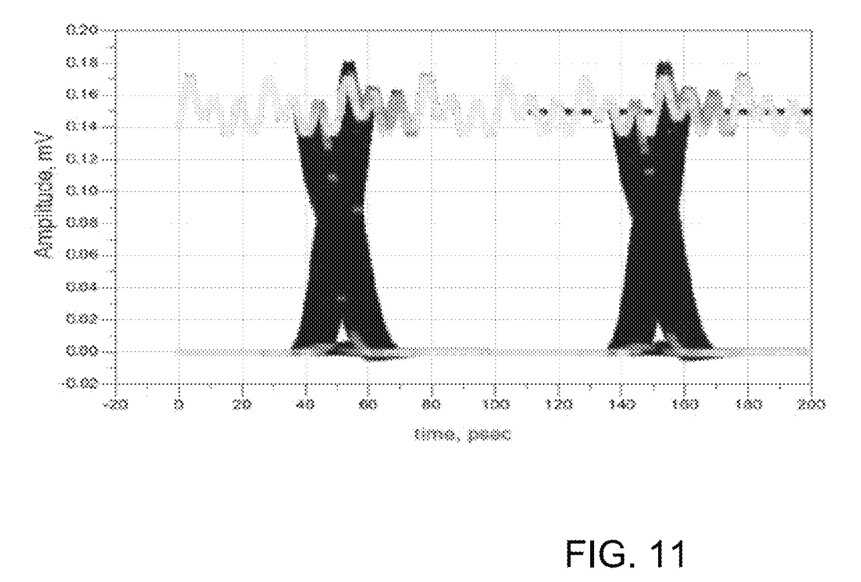
FIG. 11 is a graph of the system illustrating operation before and after the channel transmission.

In FIG. 11, the eye diagram of the system before and after the channel transmission can be seen. The simulated SNR is 23.9 dB, which leads to a BER that is lower than $10^{-15}$.

A 10-Gbps length adaptive serial link has been described. A modulated RF carrier is used to reduce the propagation delay and simplify the link design. Differential transmission lines are used to limit cross-talk effects. To increase the spectral efficiency of the link and relax the RF design constraints, duo-binary modulation is also implemented. This modulation has the same spectral efficiency as PAM-4 without the need for three comparators. Indeed, the use of a self-mixing process in reception combined with a differential pre-encoding leads to two states, thus one comparator is required. The simulation shows that the system exhibits a low BER without either code correction nor equalization. Such a device may be realized in a 28-nm FDSOI technology.

Further, instead of designing a new receiving stage for each different length of the transmission line, one receiving stage may be used for a certain range.

For example a same design can cover a range from 5 to 8 mm.

The invention claimed is:

1. A device, comprising:
   a transmission stage;
   a receiving stage; and
   a communication medium coupled between the transmission stage and the receiving stage;
   wherein said transmission stage comprises:
   input circuitry configured to receive an input base band signal;
   differential encoding circuitry coupled to said input circuitry and configured to perform a differential encoding of said input base band signal and to deliver an encoded signal, the encoded signal being a digital signal having two possible digital voltage levels and encoding data from the input base band signal solely using the two possible digital voltage levels;
   modulation circuitry configured to perform a poly-binary modulation of said encoded signal and to deliver a modulated signal, the modulated signal being a digital signal having at least three possible digital voltage levels and modulating data from the encoded signal solely using the three possible digital voltage levels; and transposition circuitry configured to perform an upward frequency transposition of said modulated signal to a radiofrequency domain;

wherein said communication medium has a first end coupled to an output of said transposition circuitry and a second end configured to deliver a transmitted signal; and wherein said receiving stage comprises:

demodulation circuitry coupled to said second end and configured to perform a downward frequency transposition of a signal issued from the transmitted signal and to deliver a received base band signal;

detection circuitry coupled between an output of said demodulation circuitry and output circuitry and configured to perform a decision process on a signal issued from said received base band signal; and wherein said output circuitry is configured to deliver an output base band signal issued from the decision process.

2. The device according to claim 1, wherein said differential encoding circuitry comprises a module configured to perform a modulo-2 addition.

3. The device according to claim 1, wherein said modulation circuitry is configured to perform a duo-binary modulation.

4. The device according to claim 1, wherein said transposition circuitry is configured to perform the upward frequency transposition of said modulated signal to a frequency greater than 10 GHz.

5. The device according to claim 1, wherein the device is embodied within an integrated circuit and the communication medium comprises a transmission line supported by said integrated circuit.

6. The device according to claim 5, wherein the transmission line is a single ended transmission line.

7. The device according to claim 5, wherein the transmission line is a differential transmission line.

8. The device according to claim 5, wherein a length of the transmission line is greater than 1 mm.

9. The device according to claim 8, wherein the length of the transmission line is greater than or equal to 5 mm.

10. The device according to claim 7, wherein a length of the transmission line is greater than 1 mm.

11. The device according to claim 10, wherein the length of the transmission line is greater than or equal to 5 mm.

12. The device according to claim 1, wherein said communication medium is a wireless communication medium.

13. The device according to claim 1, wherein said demodulation circuitry comprises a power detector.

14. The device according to claim 13, further comprising a low pass filter coupled between the power detector and said detection circuitry.

15. The device according to claim 1, wherein said demodulation circuitry comprises a self-mixer.

16. The device according to claim 15, wherein said demodulation circuitry comprises a high pass filter coupled to an input of the self-mixer and a current mirror coupled to an output of said self-mixer.

17. The device according to claim 1, wherein said detection circuitry comprises a comparator for comparing a level of said signal issued from said received base band signal with a threshold, and an inverter coupled to an input of said comparator.

18. The device according to claim 1, wherein the receiving stage further comprises a variable gain amplifier coupled between the second end of the communication medium and the demodulation circuitry.

19. The device according to claim 1, wherein said input base band signal is a digital signal containing binary data and the output base band signal is a digital signal containing said binary data.

20. The device of claim 1, wherein the differential encoding circuitry is directly electrically between the input circuitry and the modulation circuitry, and wherein the modulation circuitry is directly electrically connected to the transposition circuitry.

21. The device according to claim 1, wherein the encoded signal represents a first data state as a first of its two possible digital voltage levels and represents a second data state as a second of its two possible digital voltage levels; and wherein the modulated signal represents the first data state as a first of its three possible digital voltage levels, represents the second data state as a third of its three possible digital voltage levels, and represents a third data state as a second of its three possible digital voltage levels.

22. The device according to claim 1, wherein the encoded signal switches between its two possible digital voltage levels to indicate different data states; and wherein the modulated signal switched between its three possible digital voltage levels to indicate different data states.

23. The device according to claim 1, wherein data encoded within the encoded signal is represented by the encoded signal switching between its two possible digital voltage levels; and wherein data encoded within the modulated signal is represented by the modulated signal switching between its three possible digital voltage levels.

24. A method for transmitting an input base band signal over a communication medium, comprising:

differentially encoding of said input base band signal to deliver an encoded signal, the encoded signal being a digital signal having two possible digital voltage levels and encoding data from the input base band signal solely using the two possible digital voltage levels;

performing a poly-binary modulation of said encoded signal to deliver a modulated signal, the modulated signal being a digital signal having at least three possible digital voltage levels and modulating data from the encoded signal solely using the three possible digital voltage levels;

upward frequency transposing said modulated signal to produce a transposed signal in a radiofrequency domain;

transmitting said transposed signal over the communication medium to obtain a transmitted signal output from said communication medium;

downward frequency transposing a signal issued from the transmitted signal to deliver a received base band signal; and detecting a signal issued from said received base band signal to recover said input base band signal.

25. The method according to claim 24, wherein differentially encoding comprises performing a modulo-2 addition.

26. The method according to claim 24, wherein performing the poly-binary modulation comprises performing a duo-binary modulation.

27. The method according to claim 24, wherein upward frequency transposing produces said modulated signal at a frequency greater than 10 GHz.

28. The method according to claim 24, wherein downward frequency transposing of the signal issued from the transmitted signal comprises performing a self-mixing of said signal to produce a self-mixed signal.

29. The method according to claim 28, further comprising:
high pass filtering of said signal before the self-mixing; and
low pass filtering of the self-mixed signal.

30. The method according to claim 24, wherein detecting comprises comparing a level of said signal issued from said received base band signal with a threshold.

31. The method according to claim 24, wherein said input base band signal is a digital signal containing binary data and said binary data are recovered after demodulation.

32. The method according to claim 24, wherein the communication medium is a transmission line carried by an integrated circuit.

33. The method according to claim 24, wherein the communication medium is a wireless communication medium.

34. The method according to claim 24, wherein the encoded signal represents a first data state as a first of its two possible digital voltage levels and represents a second data state as a second of its two possible digital voltage levels; and wherein the modulated signal represents the first data state as a first of its three possible digital voltage levels, represents the second data state as a third of its three possible digital voltage levels, and represents a third data state as a second of its three possible digital voltage levels.

35. The method according to claim 24, wherein the encoded signal switches between its two possible digital voltage levels to indicate different data states; and wherein the modulated signal switched between its three possible digital voltage levels to indicate different data states.

36. The method according to claim 24, wherein data encoded within the encoded signal is represented by the encoded signal switching between its two possible digital voltage levels; and wherein data encoded within the modulated signal is represented by the modulated signal switching between its three possible digital voltage levels.

* * * * *